United States Patent [19]
Poffenberger et al.

[11] 3,978,276
[45] Aug. 31, 1976

[54] SPACER-DAMPER

[75] Inventors: James C. Poffenberger, Cleveland Heights; William F. Corkran, Shaker Heights; Ralph B. Siter, Jr., Mentor; Raymond J. Champa, Macedonia, all of Ohio

[73] Assignee: Preformed Line Products Company, Cleveland, Ohio

[22] Filed: May 2, 1975

[21] Appl. No.: 573,951

[52] U.S. Cl. .............................. 174/42; 174/146; 403/130; 403/141
[51] Int. Cl.² ..................... H02G 7/12; H02G 7/14
[58] Field of Search ............ 174/40 R, 42, 128 BL, 174/146; 403/130, 141, 217

[56] References Cited
UNITED STATES PATENTS

| | | | |
|---|---|---|---|
| 3,157,731 | 11/1964 | Torr | 174/146 X |
| 3,463,870 | 8/1969 | Eucker | 174/42 |
| 3,867,566 | 2/1975 | Lewis | 174/146 |

FOREIGN PATENTS OR APPLICATIONS

| | | | |
|---|---|---|---|
| 1,218,429 | 1/1971 | United Kingdom | 174/146 |

OTHER PUBLICATIONS

Gould advertisement, *Electrical World*, Oct. 15, 1974, p. 60.

*Primary Examiner*—Laramie E. Askin
*Attorney, Agent, or Firm*—Hume, Clement, Brinks, Willian, Olds & Cook, Ltd.

[57] ABSTRACT

There is disclosed a spacer-damper for electrical transmission cables or the like. A rigid spacer composed of mating half-sections has defined at its extremities hollow spherical sockets for receiving the spherical end portions of individual cable connector structures. The opposite ends of the connectors are fashioned for effecting a gripping connection with a cable. A resilient damping material is interposed between the spherical connector end portions and their associated receiving sockets and the damping material is secured to both the ball and the socket so that on pivoting of the connector arm attendant cable vibration or oscillation the damping material is placed in shear to effect a damping action.

7 Claims, 3 Drawing Figures

SPACER-DAMPER

INTRODUCTION

The present invention relates generally to the suspension of electrical transmission lines or the like and, more specifically, is directed to a new and improved device for maintaining a predetermined minimum spacing between subconductors on a bundled conductor transmission line while concomitantly suppressing undesired vibration and/or oscillations of the lines.

BACKGROUND OF THE INVENTION

There are two primary types of vibration which cause damage to bundled conductor transmission lines, namely, aeolian vibration and subconductor oscillations. Aeolian vibration occurs in the vertical plane, i.e., perpendicular to the ground, and at high frequencies and low amplitudes. To suppress this type of vibration it is known that a resilient connection be imposed between the conductor clamping means and the body of the spacer, allowing limited flexing in the vertical plane. Subconductor oscillations, on the other hand, occur in a horizontal plane at low frequencies and at relatively large amplitudes. Suppression of this type of vibration requires a resilient connection between the conductor clamp and body of the spacer which allows limited flexing in the horizontal plane. Since both types of vibration can exist at the same time, simultaneous flexing in both planes is necessary in order to effectively suppress such vibrations. Prior art devices such as illustrated in U.S. Pat. Nos. 3,479,441, 3,083,258, 3,567,841, 3,263,021, 3,465,089, 3,609,209 and 2,915,580 have not provided wholly satisfactory operation. Other spacer-damper devices illustrative of the state of the art are disclosed, for example, in U.S. Pat. Nos. 3,260,789, 3,474,184, 3,454,705, 3,443,019 and 3,617,609.

SUMMARY OF THE INVENTION

It is the primary objective of the present invention to provide a new and improved spacer-damper appliance for suspended cables which appliance effectively damps both aeolian vibration and subconductor oscillations.

The structure of the present invention provides a predetermined cushioning and damping influence on the motion components of bundled conductor transmission lines thereby to alleviate or preclude vibration transfer between the subconductors, torsional oscillations, excessive swaying of the lines and sharp impact between the subconductors such as are apt to cause damage to various line components such as support structures, insulators and/or the conductors themselves.

The spacer-damper of the invention includes a ball and socket connection between a cable connector arm and a rigid spacer portion of the structure. A resilient damping material such as neoprene or other elastomeric or plastic material is interposed between the ball and the receiving socket and is fixedly secured to both components. The damping material is placed in shear as a result of relative pivotal movement between the ball and socket components. Use of an elastomer in shear as opposed to the development of compression or tension on the elastomer has been found highly effective in suppressing aeolian vibration and subconductor oscillations.

Accordingly, the present invention is directed to a device for maintaining a predetermined minimum spacing between electrical transmission cables, subconductors or the like and for damping vibratory or oscillatory motion of the cables. Specifically, the device comprises cable connector means including a plurality of similar connector structures each having a first end portion for effecting a gripping connection with a cable and a second end portion of a generally spherical, ball-like contour. A rigid spacer means includes a plurality of hollow sockets of a generally spherical contour for receiving respective ball-like end portions of said cable connector means. A resilient damping means is interposed between said ball-like second end portions of each of said connector structures and associated receiving sockets of said spacer means. There is further provided means for securing the damping means against movement relative to both the ball-like end portions of said connector means and their associated receiving sockets for placing the damping means in shear upon relative pivotal movement of the ball-like end portions and their associated receiving sockets.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

DESCRIPTION OF THE PREFERRED EMBODIMENTS

Figure 1:
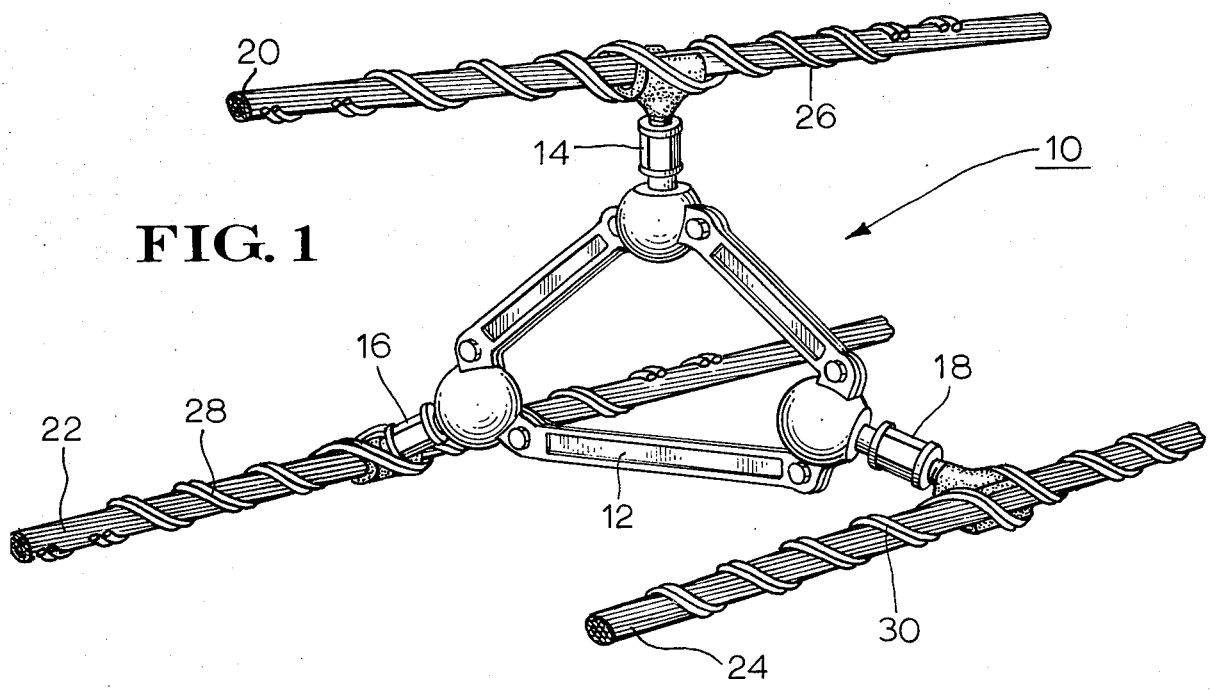
FIG. 1 is a perspective view of a spacer-damper device of the invention as applied between a trio of electrical transmission cables.

Referring now to FIG. 1, there is shown a spacer assembly 10 according to the present invention and including a rigid triangular spacer means 12 and associated connector means 14, 16 and 18. As will presently be explained in detail, the connector means 14, 16 and 18 each has one end portion coupled to a vertex of the triangular spacer 12 and respective opposite end portions coupled in gripping relation to corresponding ones of a plurality of suspended lines 20, 22 and 24. The suspended lines 20, 22 and 24 herein illustrated are the so-called bundled conductors used in the transmission of electrical power and, in this regard, it will be understood that the lines are at a like electrical potential consistent with the principles of the present invention. Furthermore, although the spacer 12 is of a triangular configuration, it will be recognized by those skilled in the art that the principles of the invention are applicable to the spacing of any two or more lines and that the spacer may take the form of a straight arm, a rectangle and so on.

The cable engaging end portions of the connector means 14, 16 and 18 are in the form of identical U-shaped members of a dimension for accommodating an individual cable between the legs of the U. The cables are secured to the U-shaped end portions of the respective connectors by means of respective sets of conventional helically preformed elements 26, 28 and 30 intertwined about the cables and U-shaped end portions of the connectors. Each set of helical rods is composed of at least one and preferably a plurality of individual helical elements.

The illustrated structure of the U-shaped end portions of the connectors 14, 16 and 18, as well as the preformed helical rods 26, 28 and 30 for maintaining the connectors in secure engagement with the respective cables are substantially identical to that disclosed in Eucker, U.S. Pat. No. 3,463,870, assigned to the same assignee as the present invention. However, it will be understood that other cable gripping arrangements may be used in place of that described consistent with the teachings of the present invention.

In accordance with the present invention, aeolian vibrations and subconductor oscillations are suppressed by means of a particular structural interconnection between the connector means 14, 16 and 18 and the triangular spacer 12. The structural features of the invention may be appreciated by reference to FIG. 2 wherein it is seen that the spacer 12 is composed of a pair of mating and identical half-sections 12a and 12b. Each of the three sides of the exemplary half-section 12a is composed of aluminum or other generally rigid material. The three vertices are integrally connected to the legs and are formed with identical hemispherical recesses exemplified by the recess 32. In the present embodiment, the sidewalls of the hemispherical recess 32 and the sidewalls of its counterpart are provided with a groove or depression 34 lying on a diameter of the hemisphere. A horseshoe-shaped flange 36 is formed about the periphery of each hemispherical recess and is provided with a pair of spaced bolt receiving apertures for facilitating securance to the mating flange 12b. As is apparent from the drawing, each of the hemispherical recesses of the spacer sections 12a and 12b is identical and upon assembly of the two sections, three generally spherical receiving sockets are formed by the mating hemispherical sections. The half-sections of the spacer are retained in assembled relation by six bolts extending through the pairs of bolt apertures formed in the flanges about each hemispherical recess.

Figure 2:
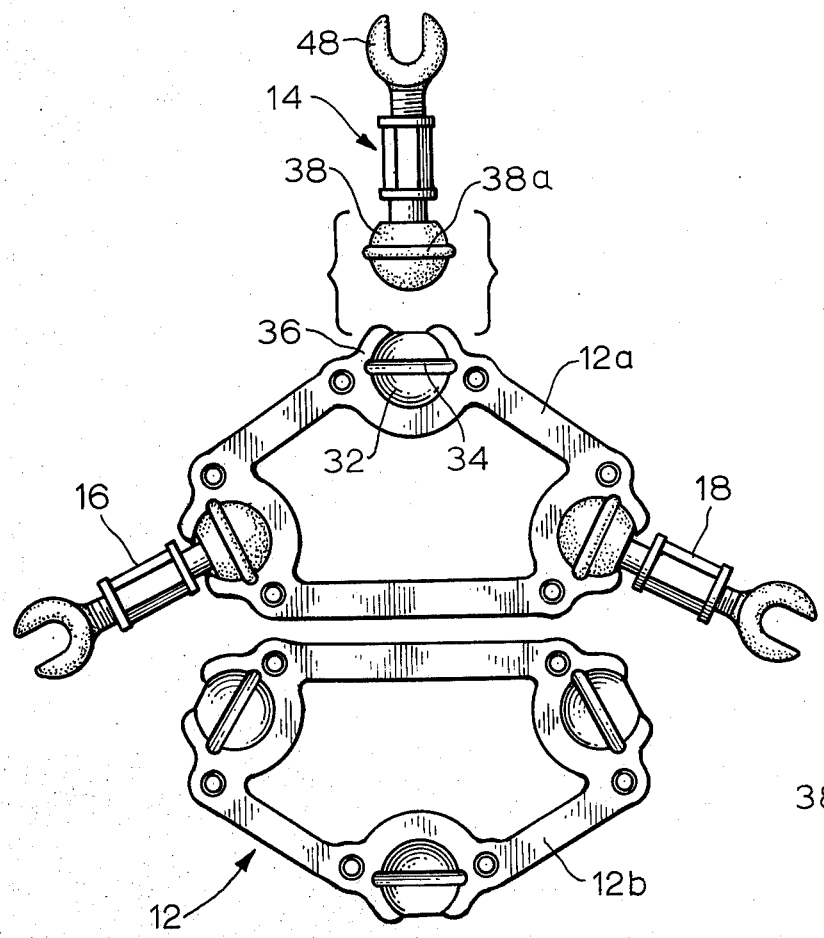
FIG. 2 is an enlarged plan view of the major components of the device of FIG. 1.

The generally spherical or ball-like second end portion of each of the connector means 14, 16 and 18 is disposed in a respective one of the spherical receiving sockets. In FIG. 2, the ball-like end portions of the connectors 16 and 18 are shown seated in respective hemispherical recesses of the spacer section 12a, while the connector 14 is shown removed from its associated socket. Assembly of the device is completed by installing the connector 14 in its associated hemispherical recess, placing the mating spacer section 12b over the described subassembly and bolting the two sections together.

In accordance with the present invention, a mechanical interconnection is effected between the ball-like second end portion of each of the connector structures 14, 16 and 18 and the associated receiving sockets of the spacer in a manner so as to develop shear forces across a resilient damping means interposed between the socket and connector structures. It has been found that provision of a joint wherein the resilient material is placed in shear affords an improved damping of aeolian vibration and subconductor oscillations as compared to prior art constructions wherein the resilient damping material is placed in tension or compression. In the present embodiment and as depicted in connection with the exemplary connector structure 14, a layer of resilient damping material 38 is disposed over the outer surface of the ball-like second end portion of the connector 14. A circumferential rib 38a formed integrally with the layer 38 is of a dimension complementary to the groove 34 in the socket recess 32. The rib 38a in conjunction with groove 34 provide an interlock between the resilient layer 38 and the receiving socket so that pivotal movement of each ball within its associated socket results in a shear force being applied across the layer of resilient material.

Figure 3:
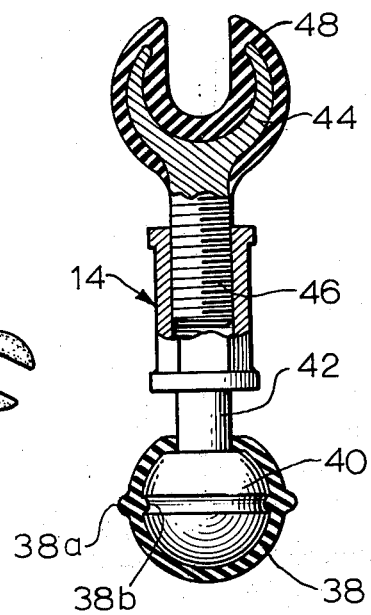
FIG. 3 is an elevational view partly in section of the connector arm component of the device.

A better understanding of the structure of the exemplary connector 14 may be had by reference to FIG. 3. As there shown, the ball-like second end portion includes a rigid generally spherical core 40 composed of metal or the like and integrally connected to an arm member 42. The sphere 40 at its point of connection with the arm 42 is slightly truncated in a plane transverse to the axis of the arm 42. The resilient damping material 38 which may be any one of a variety of conventional resilient damping materials, such as Neoprene or other elastomeric or plastic material, is applied as a generally uniform layer over the exterior surface of the ball 40, except for the circumferential ribs 38a and 38b. The ribs 38a and 38b preferably are located along a diameter of the ball 40 and in a plane perpendicular to the axis of the arm 42. As previously mentioned, the rib 38a is of a dimension complementary to that of the receiving socket groove, and must furthermore be of a size and rigidity to assure a secure mechanical interconnection with the socket under normal operating conditions. To this same end, the spherical receiving socket is preferably dimensioned relative to its associated ball so as to apply a firm pressure to the ball. As an alternative or supplement to the mechanical interconnection formed by the ribs 38a and 38b, the damping means 38 may be adhesively secured to the ball 40 and to the receiving socket during assembly. The truncated portion of the ball and the associated lip of each receiving socket cooperate to captivate the connector structure and prevent excessive pivotal movement of the connector relative to the receiving socket.

The thickness and rigidity of the elastomeric material as well as its precise composition are dependent upon the contemplated operating environment and are empirically determined.

The exemplary connector 14 also includes a first end portion for effecting a mechanical interconnection with a cable. The structure of the first end portion as herein disclosed is identical to that disclosed in U.S. Pat. No. 3,463,870 — Eucker and assigned to the same assignee as the present invention. Specifically, the first end portion comprises a rigid generally U-shaped cable receiving portion 44 integrally connected to a bolt 46 that is threadably received in a sleeve of the spacer arm 42. The axis of the bolt 46 is transverse to the open mouth of the U-shaped member 44. The threaded interconnection between the first and second end portions of the connector 14 permits a manual adjustment of the effective length of the connector. Although not illustrated, a locking nut may be provided for precluding relative rotational movement between the respective end portions of the connector. Alternatively, the sleeve portion of spacer arm 42 and threaded end of cable receiving portion 44 can be made without threads and the assembly made by crimping or compressing the said sleeve portion after adjustment of the components to a desired relative axial position. The rigid U-shaped member 44 is embedded in a rubber-like cushion material 48. The molded cushion 48, in addition to absorbing impact forces from the cable and damping excessive motion thereof, also prevents abrasion or fatigue damage to the spacer end portion 44, the cable and the surrounding helical elements.

While particular embodiments of the present invention have been shown and described, it is apparent that various changes and modifications may be made, and it is therefore intended in the following claims to cover all modifications and changes as may fall within the true spirit and scope of this invention.

We claim:

1. A device for maintaining a predetermined minimum spacing between electrical transmission cables or the like and for damping vibratory oscillatory motion of such cables, comprising:

cable connector means comprising a plurality of similar connector structures each having a longitudinal axis, a first end portion for effecting a gripping connection with a cable and a second end portion of a generally spherical, ball-like contour;

rigid spacer means including a plurality of hollow sockets of a generally spherical contour, each said socket receiving respective ones of said ball-like end portions of said cable connector means;

said cable connector means and said spacer means disposed in a common plane;

resilient damping means interposed between said ball-like second end portions of each of said connector structures and the associated receiving sockets of said spacer means; and means securing said damping means against movement relative to both said ball-like end portions of said connector means and their associated receiving sockets for placing said damping means in shear upon relative pivotal movement of said ball-like end portions and their associated receiving sockets, said securing means including circumferential ribs on said damping means, said ribs mating with complementary circumferential recesses in the respective receiving sockets and in the ball-like end portions, and each said rib and said recess being generally perpendicular to the longitudinal axis of their associated connector structure and to said common plane.

2. The device of claim 1 in which said securing means further includes an adhesive affixation of said damping means to both said ball-like end portions of said connector means and to said receiving sockets.

3. The device of claim 2 in which said first and second end portions of said plurality of connector structures are displaceable relative to one another for adjusting the effective length of said connector structures.

4. The device of claim 3 in which said spacer means comprises a pair of symmetrical mating half-sections secured to one another by bolts.

5. The device of claim 1 in which said circumferential ribs lie on diameters of their associated ball-like end portions.

6. The device of claim 5 in which said ball-like end portions comprise truncated spheres and in which said spheres are truncated in respective planes perpendicular to said longitudinal axes of said connector means.

7. The device of claim 6 in which said first end portion of said connector means each comprises a U-shaped member for receiving one of said cables between the legs of said U.

* * * * *